United States Patent
Kume et al.

(10) Patent No.: US 9,475,140 B2
(45) Date of Patent: Oct. 25, 2016

(54) CUTTING DEVICE

(71) Applicant: MAKITA CORPORATION, Anjo-shi, Aichi (JP)

(72) Inventors: Sho Kume, Anjo (JP); Kenji Abe, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 267 days.

(21) Appl. No.: 14/259,901

(22) Filed: Apr. 23, 2014

(65) Prior Publication Data
US 2014/0331505 A1     Nov. 13, 2014

(30) Foreign Application Priority Data

May 9, 2013   (JP) ................... 2013-099010

(51) Int. Cl.
  *B23D 59/00*   (2006.01)
  *B27B 9/00*    (2006.01)
  *B23D 45/16*   (2006.01)

(52) U.S. Cl.
  CPC ............ *B23D 59/006* (2013.01); *B23D 59/00* (2013.01); *B23D 45/16* (2013.01); *B27B 9/00* (2013.01)

(58) Field of Classification Search
  CPC ...... B23D 59/006; B23D 45/16; B27B 9/00; B27B 9/02; B27B 9/04
  USPC .................................................. 30/380–394
  See application file for complete search history.

(56) References Cited

U.S. PATENT DOCUMENTS

| | | | | |
|---|---|---|---|---|
| 1,830,579 A | * | 11/1931 | Wappat ................ | B23D 59/002 30/391 |
| D326,399 S | * | 5/1992 | Fushiya ........................ | D8/66 |
| 5,832,614 A | * | 11/1998 | Gallagher .............. | B27G 19/04 30/390 |
| D408,248 S | * | 4/1999 | Zurwelle .......................... | D8/66 |
| 6,202,311 B1 | * | 3/2001 | Nickels, Jr. ............... | B27B 9/02 30/376 |
| D453,099 S | * | 1/2002 | Welsh .............................. | D8/66 |
| D488,977 S | * | 4/2004 | Evans .............................. | D8/66 |
| 6,981,779 B2 | * | 1/2006 | Fukuoka ................ | B23D 59/00 362/119 |
| D514,411 S | * | 2/2006 | Yuen ................................ | D8/66 |
| D538,124 S | * | 3/2007 | Yamamoto ....................... | D8/66 |
| 7,275,326 B2 | * | 10/2007 | Tanimoto ........... | B23Q 17/2404 30/123.3 |
| D555,450 S | * | 11/2007 | Van Wambeke ................. | D8/66 |
| 7,380,343 B2 | * | 6/2008 | Yoshimura ........... | B23D 59/006 30/388 |
| 7,426,787 B2 | * | 9/2008 | Tracy ..................... | B27G 19/04 30/373 |
| 8,037,610 B2 | * | 10/2011 | Chambers ............ | B23D 59/006 30/124 |
| 8,056,244 B2 | * | 11/2011 | Matsumoto .......... | B23D 59/006 30/124 |
| 8,276,281 B2 | * | 10/2012 | Zhang .................. | B23D 59/003 30/376 |
| 8,739,417 B2 | * | 6/2014 | Tokunaga .............. | B23D 47/12 30/263 |

(Continued)

FOREIGN PATENT DOCUMENTS

| | | |
|---|---|---|
| JP | A-2005-193572 | 7/2005 |
| JP | A-2006-88559 | 4/2006 |
| JP | A-2009-214292 | 9/2009 |

*Primary Examiner* — Jason Daniel Prone
*Assistant Examiner* — Richard Crosby, Jr.
(74) *Attorney, Agent, or Firm* — Oliff PLC

(57) ABSTRACT

A wind shielding portion is provided in a front side of an exhaust port for cooling air from a motor such that it crosses over a lateral width with respect to a cutting direction. The cooling air which is blown to the wind shielding portion is effectively blown through a ventilation portion having a small ventilating resistance force and towards a marking line guide. Even when the cutting device main body is set at an incline, the cooling air is blown to the wind shielding portion, and is effectively blown through the ventilation portion to the marking line guide.

6 Claims, 5 Drawing Sheets

(56) References Cited

U.S. PATENT DOCUMENTS

| | | | |
|---|---|---|---|
| 9,073,228 B2* | 7/2015 | Inayoshi | B26D 7/18 |
| 2003/0131484 A1* | 7/2003 | Yoshida | B27B 9/02 30/376 |
| 2004/0107584 A1* | 6/2004 | Yoshida | B23D 59/006 30/391 |
| 2005/0178256 A1* | 8/2005 | Bocka | B23D 59/006 83/170 |
| 2006/0065097 A1 | 3/2006 | Yoshimura et al. | |
| 2009/0223070 A1 | 9/2009 | Yang et al. | |

* cited by examiner

CUTTING DEVICE

This application claims priority to Japanese patent application serial number 2013-99010, the contents of which are incorporated herein by reference.

BACKGROUND OF THE INVENTION

1. Field of the Invention

The present invention relates to a cutting device such as a portable circular saw, and particularly to a cutting device that cuts a workpiece such as wood by rotating a circular cutting blade (saw blade).

2. Description of the Related Art

A cutting device such as a portable circular saw may have a cutting device main body in which a circular cutting blade rotates via the driving of an electric motor. The cutting device main body is disposed at an upper side of a base. The base is brought into contact with an upper surface of a workpiece. A user can cut a workpiece by moving the cutting device in a cutting direction. The cutting blade protrudes toward a lower surface side of the base cuts into the workpiece.

In these kinds of cutting devices, various improvements have been made to effectively process cutting powder generated by the cutting of a material and increase the efficiency of the cutting. In particular, a marking line guide for positioning a cutting blade on a marking line drawn on the workpiece is provided on a front end side of the base. In case that the marking line guide and the marking line are not easily viewed due to accumulation of the cutting powder, rapid cutting cannot be performed. Considering this situation, improvements have been made to appropriately process the cutting powder in the vicinity of the marking line guide.

For example, Japanese Laid-Open Patent Publication No. 2005-193572 discloses that cutting powder is prevented from being accumulated by purging the power accumulated around the marking line guide (top guide) provided on a front side of a base by using cooling air that is discharged from an electric motor. Further, Japanese Laid-Open Patent Publication No. 2006-088559 discloses that cutting powder is prevented from being accumulated on a base by effectively collecting the cutting powder in a collection path provided in a blade case using a flow generated by the rotation of a cutting blade and a cooling air from an electric motor. In addition, Japanese Laid-Open Patent Publication No. 2009-214292 discloses a technique that prevents cutting powder from being accumulated by effectively introducing cooling air exhausted from a cutting device main body into a front portion of a base.

In a cutting device such as a portable circular saw, the cutting powder may accumulate largely in the vicinity of the marking line guide provided on the front side of the base. This thereby reduces the visibility of the marking line guide. In order to prevent a reduction in the operability of the cutting device, improvements have been made such that the cutting powder is prevented from being accumulated in the vicinity of the marking line guide of the base front end by purging the power with cooling air discharged form the cutting device main body.

However, in these kinds of cutting devices, a cutting device main body is configured to incline on a right side or left side in a cutting direction with respect to a base to perform so-called an inclination cutting. Further, it is configured such that in order to purge cutting power accumulated around a marking line guide on a front side of a base with a cooling air, a ventilation pipe portion is provided on a rear side of a blade case to guide the cooling air discharged from an exhaust port of an electric motor to the front side of the base. Accordingly, when the cutting device main body is inclined with respect to the base to perform the inclination cutting, a purging direction of the cooling air discharged from the ventilation pipe portion is changed and sufficient air is not applied to the vicinity of the front side of the base. As a result, purging of the cutting powder is not sufficiently performed and the ease in operation of the tool can deteriorate.

Thus, there is a need to maintain high operability by effectively purging the cutting power with the cooling air exhausted from the cutting device main body to the vicinity of a top guide of the front side of the base. This needs to be maintained when the cutting device main body is positioned not only at a perpendicular cutting position but also at an inclination cutting position.

SUMMARY OF THE INVENTION

According to a first aspect of the present invention, there is provided a cutting device including a base that is brought into contact with an upper surface of a workpiece, and a cutting device main body that is supported on an upper surface side of the base and includes a circular cutting blade that is rotated by an electric motor. The circular cutting blade for cutting into the workpiece protrudes toward a lower surface side of the base. Further, a wind shielding portion is provided such that it crosses between a marking line guide provided on a front portion of the base and the cutting blade. A ventilation portion for flowing cooling air from the electric motor in the forward direction is provided in the wind shielding portion such that it is positioned at a front side of the cutting blade. Further, electric motor is configured to blow the cooling air through the ventilation portion to the marking line guide.

In the first aspect, after the cooling air from the electric motor of the cutting device main body is blown to the wind shielding portion and flows while being subjected to resistance along the wind shielding portion, the cooling air flows to the front side of the wind shielding portion through the ventilation portion which is not subjected to the flow resistance of the air. The ventilation portion is positioned at the front side of the cutting blade, and thus, the cooling air is directly blown to the marking line guide. Since the cooling air is blown through the ventilation portion to the marking line guide, accumulation of cutting powder in the vicinity of the marking line guide is suppressed and high visibility of the marking line guide is maintained. In this way, high operability of the cutting device is maintained.

Since the wind shielding portion is provided to cross the front side of the cutting blade not only when the cutting device main body is positioned at a perpendicular cutting position, but also when the cutting device main body is positioned at an inclination cutting position, the cooling air is effectively blown to the wind shielding portion. Accordingly, even when the so-called inclination cutting is performed, the cutting powder accumulated on the marking line guide can be effectively purged. In this way, high visibility and operability can be maintained.

According to another aspect of the present invention, the wind shielding portion includes wall portions in the right and left sides in a cutting direction. Further, an opening serving as the ventilation portion is provided between the wall portions, and the ventilation portion is provided such that it is opened to the upper direction.

In the above aspect, the cutting powder can be purged by blowing the cooling air through the ventilation portion and to the marking line guide.

According to another aspect of the present invention, the wind shield portion may include an angular plate and a regulation wall portion. The angular plate that supports the cutting device main body is provided such that the cutting device main body can be inclined in the lateral direction with respect to the cutting direction. Further, the regulation wall portion is disposed side by side in parallel to the angular plate such that it crosses the front side of the cutting blade, and an opening for serving as the ventilation portion is provided between the regulation wall portion and the angular plate In the above aspect, the cooling air is blown to the marking line guide through the ventilation portion which corresponds to the opening located between the angular plate and the regulation wall portion.

According to another aspect of the present invention, the wind shield portion is configured such that an angular plate that supports the cutting device main body is provided such that the cutting device main body can be inclined in the lateral direction with respect to the cutting direction. Further, the angular plate extends such that it crosses the front side of the cutting blade.

In the above aspect, the wind shielding portion is formed by extending the angular plate to an opposite side in the cutting direction.

As described above, the wind shielding portion is provided such that it extends in both the right and left sides in the cutting direction with respect to the cutting blade, and the ventilation portion is provided in the wind shielding portion at the front side (on the same plain) of the cutting blade. The cooling air is blown to the wind shielding portion regardless of the inclination position of the cutting device main body and the cooling air can be effectively blown to the marking line guide through the ventilation portion having a smaller ventilating resistance. Accordingly, the wind shielding portion may include the angular plate positioned at one side of the right and left sides in the cutting direction. The wind shielding portion may also include a regulation wall portion positioned adjacent to the angular plate. This regulation wall portion interposes a ventilation portion (opening) on the side opposite the angular plate side. Alternatively, the wind shielding portion may be configured such that that the angular plate extends to the opposite side in the cutting direction to form the ventilation portion at the front side of the cutting blade. In these ways, the same effects as the first aspect can be obtained.

According to another aspect of the present invention, the ventilation portion is configured to have a V shape such that a width of the ventilation portion gradually narrows toward a lower side close to the base.

In the above aspect, a flow rate of the wind passing through the ventilation portion increases as it approaches the lower side close to the base. Accordingly, the cutting powder in the vicinity of the marking line guide can be effectively purged.

According to another aspect of the present invention, an exhaust hole is provided in the left side of the wind shielding portion with respect to the cutting direction. Further, the cooling air from the motor is configured to blow to the marking line guide through the exhaust hole in addition to the ventilation portion.

In the above aspect, a larger amount of cooling air is blown through both the ventilation portion and the exhaust hole to the marking line guide. In this way, cutting powder can be purged more effectively.

DETAILED DESCRIPTION OF THE INVENTION

Each of the additional features and teachings disclosed above and below may be utilized separately or in conjunction with other features and teachings to provide an improved cutting device. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
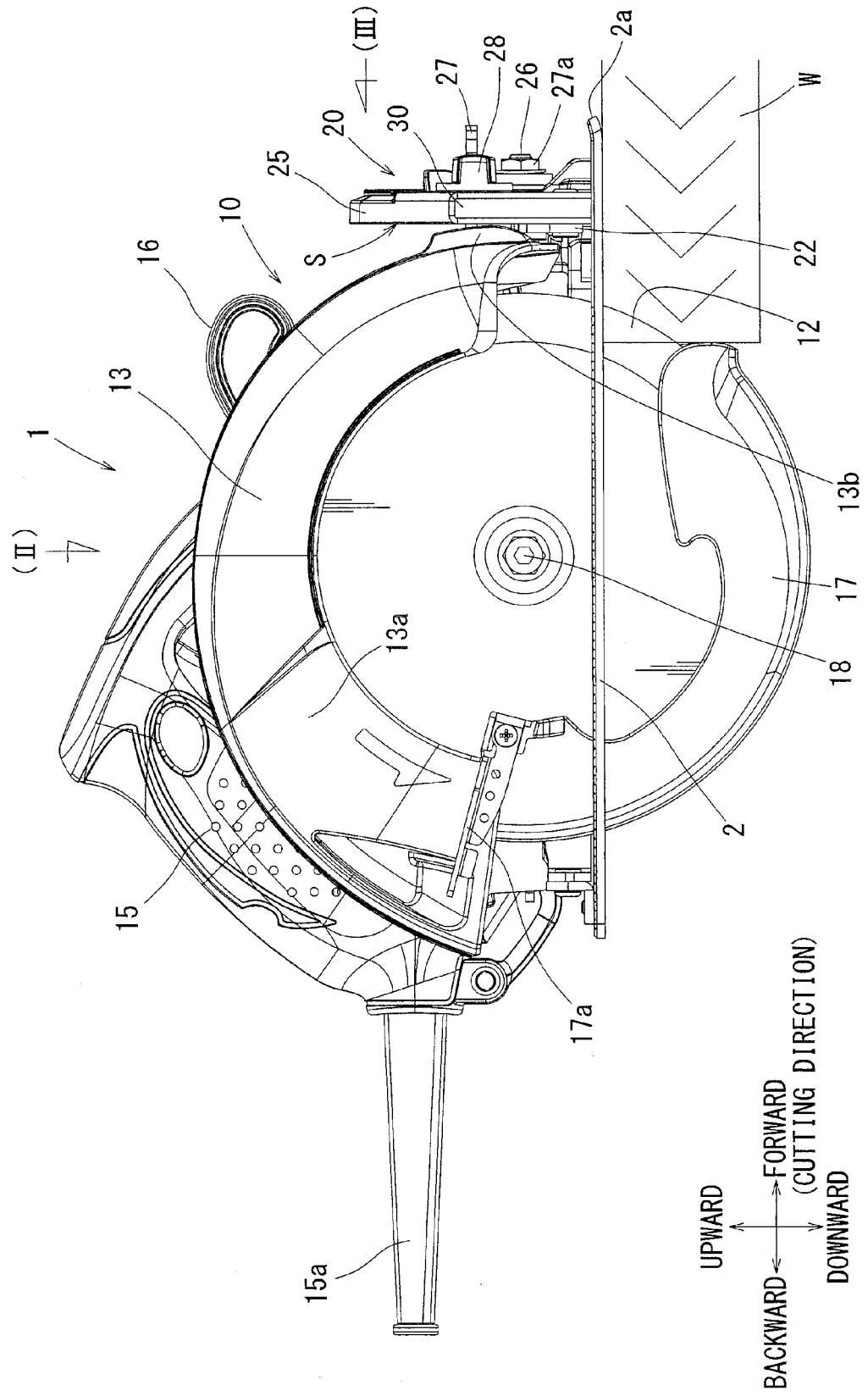
FIG. 1 is a right side view of a cutting device according to an embodiment of the present invention.
Figure 2:
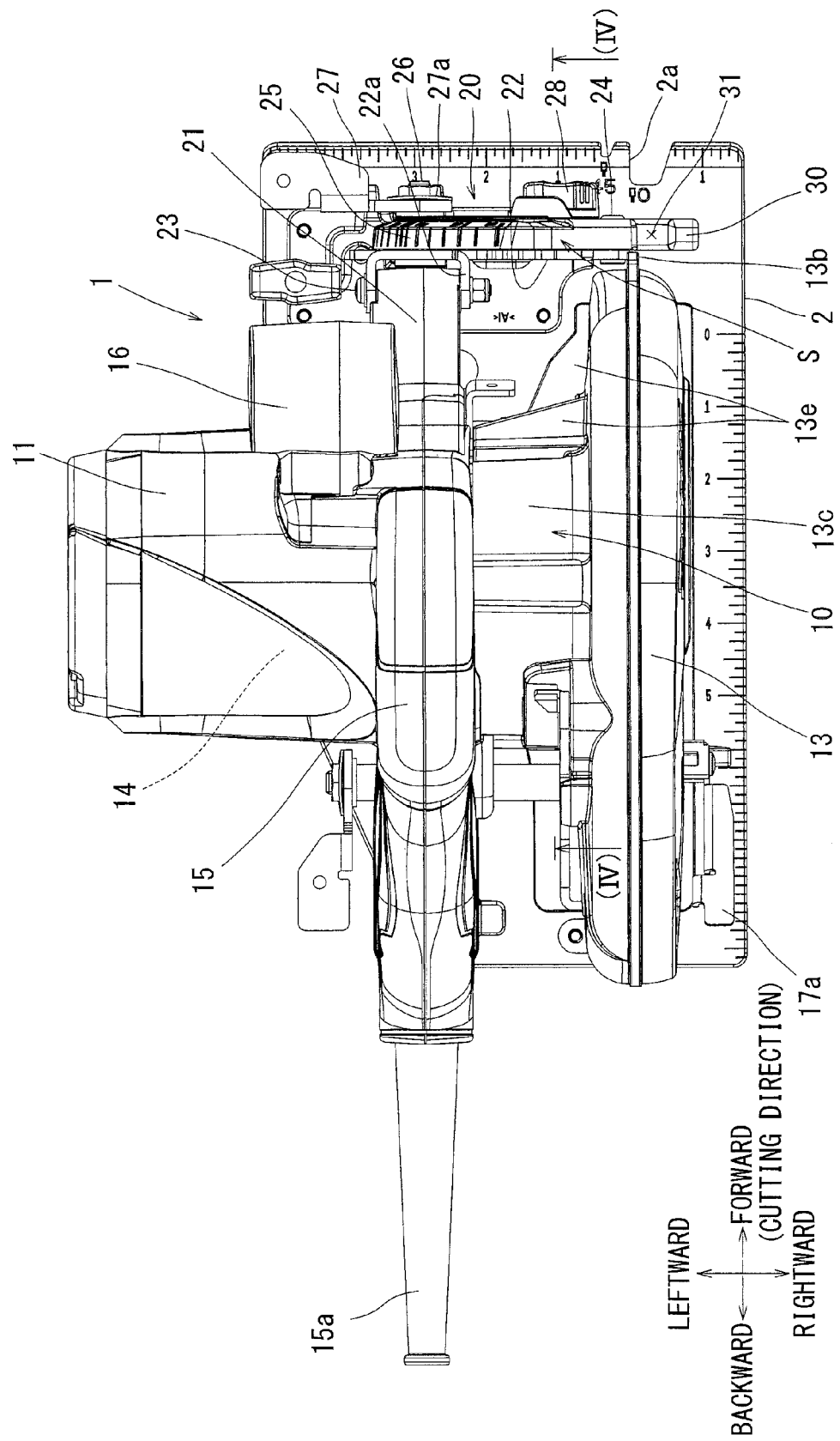
FIG. 2 is a plan view when the cutting device according to the present embodiment is viewed from an arrow (II) direction of FIG. 1.
Figure 3:
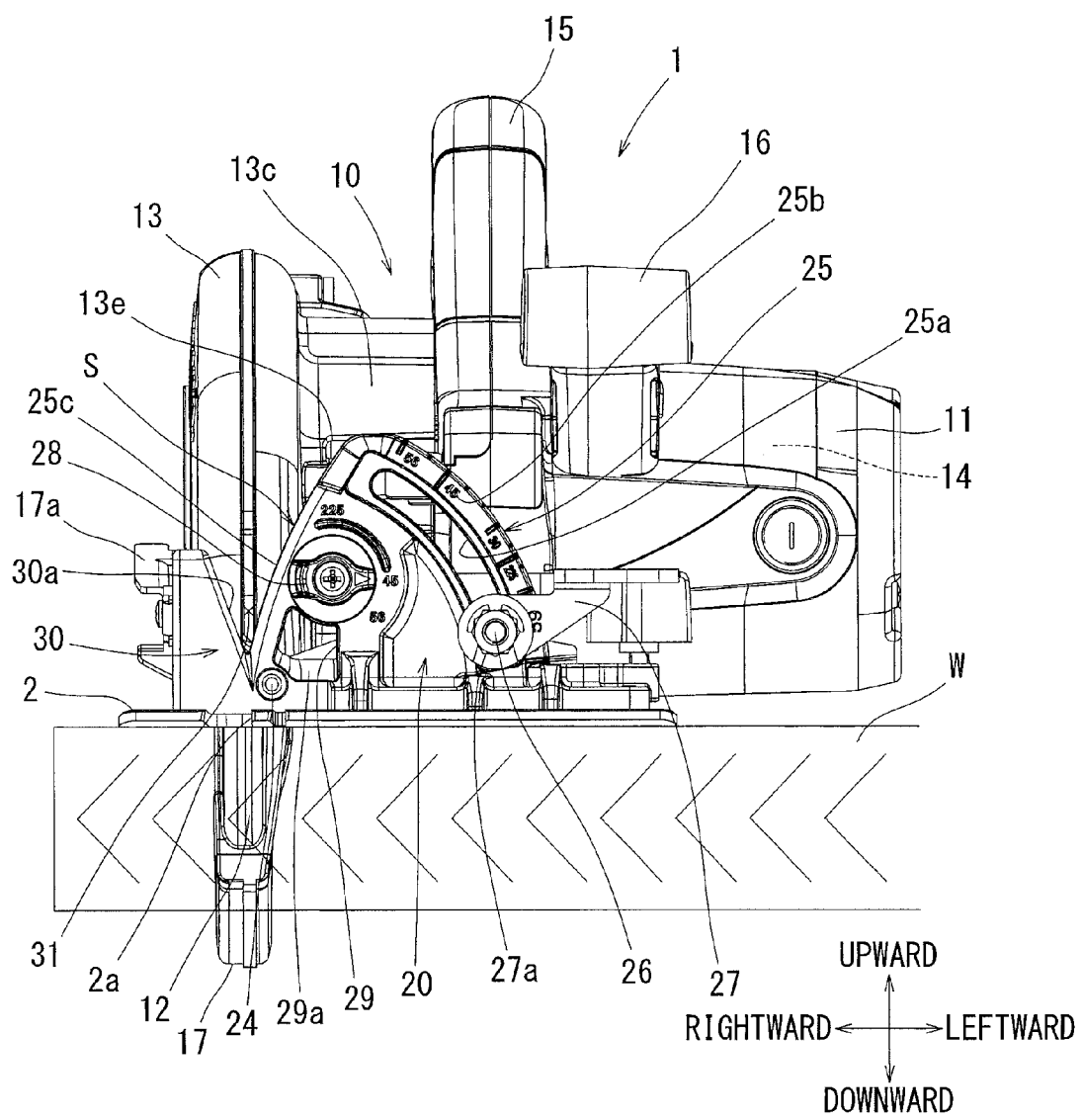
FIG. 3 is a front view of the cutting device according to an embodiment.

One embodiment of the present invention will be described below with reference to FIGS. 1 to 7. FIGS. 1 to 3 show a cutting device 1 according to the present embodiment. A workpiece W is cut by moving the cutting device 1 to the right side in FIG. 1. In the following descriptions, a direction (cutting direction) in which cutting proceeds is referred to as a front side. A user is positioned at a rear side of the cutting device 1. Further, an up-down direction and a right-left direction of a member or a configuration of the cutting device are based on the user's position.

A base 2 has an approximately rectangular flat-plate shape, and there is provided on a front end portion of the base a marking line guide (top guide) 2a for positioning a cutting blade 12 along a marking line drawn on an upper surface of the workpiece W.

The cutting device 1 is a handheld cutting device such as a portable circular saw. The cutting device 1 includes a base 2 that is brought into contact with the upper surface of the workpiece W and a cutting device main body 10 that is supported via a main body support portion 20 located on an upper surface of the base 2.

The cutting device main body 10 includes the circular cutting blade 12 that is rotated by an electric motor 14 serving as a driving source. An upper half periphery of the cutting blade 12 is covered by a fixing cover portion 13*a* of a blade case 13. The electric motor 14 is mounted via a reduction gear portion that is provided in a cylindrical portion 13*c* of a rear surface (left side surface) of the blade case 13. As described below, a wall portion 13*b* that regulates the flow of cooling air from the motor is provided on a front portion of the fixing cover portion 13*a*. The wall portion 13*b* is provided to extend to the front side in a flat plate shape in approximately the same plane as the cutting blade 12. As shown in FIG. 1, the wall portion 13*b* is provided to extend to the front side such that the wall portion does not interfere with a wind shielding portion S (angular plate 25 and regulation wall portion 30).

A loop shaped handle portion 15 that can be grasped by a user is provided in the vicinity of a joint portion between a motor housing 11 and a cylindrical portion 13*c*. A front grip 16 is provided on a front portion of the handle portion 15. The user moves and operates the cutting device 1 while grasping the handle portion 15 by one hand and the front grip 16 by the other hand. An electric cord 15*a* for AC power supply is pulled in the rear portion of the handle portion 15.

Figure 4:
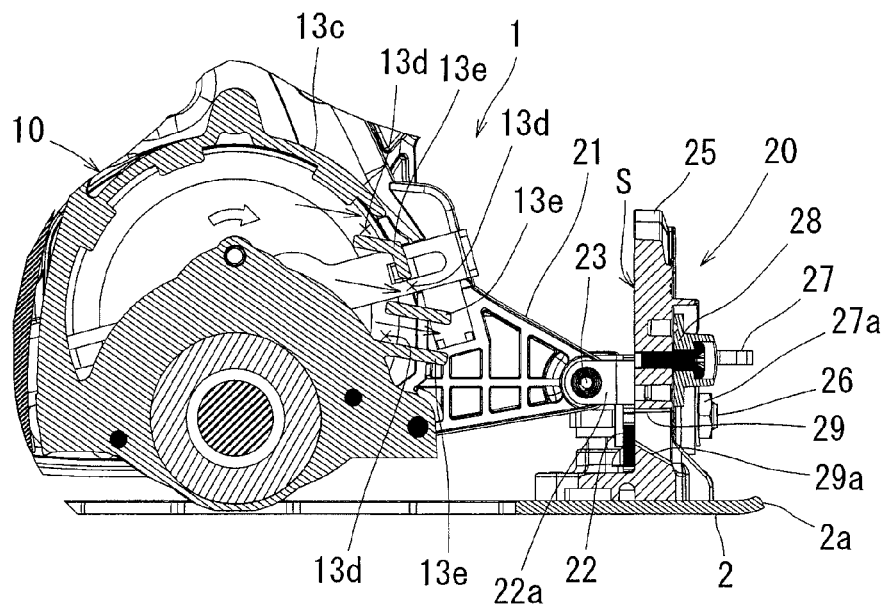
FIG. 4 is a cross-sectional view taken along an arrow (IV)-(IV) of FIG. 2 of the cutting device according to an embodiment.

As shown in FIG. 4, exhaust ports 13*d*-13*d* for discharging the cooling air forward are provided on a front circumferential surface of the cylindrical portion 13*c*. A fin 13*e* for guiding the cooling air in a discharging direction is provided in each exhaust port 13*d* such that they extend in a forward direction. A void arrow in FIG. 4 shows a rotation direction (clockwise direction) of a cooling fan (not shown) that is rotated by the electric motor 14. The cooling fan is rotated in a direction shown by the void arrow in FIG. 4, and the cooling air from the motor is discharged forward and downward at an angle (a direction indicated by an arrow) through each of the exhaust ports 13*d*-13*d*. After the discharged cooling air is blown to the rear surface of the wind shielding portion S, the wall portion 13*b* regulates diffusion of the cooling air toward the right side in the cutting direction.

As shown in FIG. 1, the cutting blade 12 is rotated in a counterclockwise direction. The cutting blade 12 is mounted on an output shaft 18 in the blade case 13. A lower portion side of the cutting blade 12 protrudes from a lower surface side of the base 2. A cutting process is made by the protruding portion being cut into the workpiece W. The circumference of the lower portion side of the cutting blade 12 is covered by a movable cover 17. The movable cover 17 is opened and closed by the moving operation of the cutting device 1 in a state where the front end of the movable cover comes into contact with the workpiece W. An opening and closing lever 17*a* is provided on the rear portion of the movable cover 17. By grasping the opening and closing lever 17*a*, a user can open and close the movable cover 17 by a manual operation. A spring is biased to the closing side of the movable cover 17.

The cutting device main body 10 is tiltably supported in an up and down direction and tiltably supported in a right and left direction in the upper surface side of the base 2 via the main body support portion 20. By cutting the cutting device main body 10 in the up and down direction with respect to the base 2, a protrusion amount of the cutting blade 12 protruding from the lower surface side of the base 2 can be varied. In this way, the cutting depth of the workpiece W can be adjusted. Further, by inclining the cutting device main body 10 to the left side or the right side with respect to the base 2, a so-called inclination cutting of the workpiece W can be performed. The front portion side of the cutting device main body 10 is supported via the main body support portion 20 on the upper surface of the base 2. The rear portion side of the cutting device main body 10 is supported via an auxiliary support portion on the upper surface of the base 2. As shown in FIG. 2, a support arm portion 21 is integrally provided on the front portion of the handle portion 15. The support arm portion 21 extends in the forward direction. The front portion of the support arm portion 21 is connected to a bracket portion 22*a* of a tilting base 22 via a vertical tilting shaft 23 such that it can be tilted in the up and down direction. By tilting the cutting device main body 10 in the up and down direction around the vertical tilting shaft 23, the protrusion amount of the cutting blade 12 protruding from the lower surface side of the base 2 can be varied. In this way, the cutting depth of the cutting blade 12 with respect to the workpiece W can be adjusted.

The tilting base 22 is connected along the rear surface of the angular plate 25 via a horizontal tilting shaft 24 such that it can be rotated in the up and down direction. For example, by rotating the tilting base 22 in a counterclockwise direction around the horizontal tilting shaft 24, the cutting device main body 10 can be inclined to the right side in the cutting direction (refer to FIG. 3). By setting the cutting device main body 10 to the right side at an angle (a direction in which the lower end side of the cutting blade 12 is displaced to the left side), a rotation axis (a rotation axis of the output shaft 18) of the cutting blade 12 can be set at an incline with respect to the upper surface of the workpiece W. In this way, the so-called inclination cutting can be performed.

As shown in FIG. 3, the angular plate 25 has an approximately fan-shaped flat plate shape. The angular plate 25 is fixed such that it stands on the upper surface of the base 2. An arcuate groove hole 25*a* is provided along the outer circumferential side of the angular plate 25. A fixation screw 26 is inserted into the groove hole 25*a*. The fixation screw 26 is connected to the tilting base 22. A nut 27*a* provided on a lever 27 can be fastened to the fixation screw 26.

By rotating the lever 27 by an appropriate angle in a screw loosening direction, the fastening state of the nut 27*a* with respect to the fixation screw 26 can be loosened. In this way, the fixation state of the tilting base 22 with respect to the angular plate 25 can be released. By releasing the fixation state of the tilting base 22 with respect to the angular plate 25, the cutting device main body 10 can be tilted to the right direction or left direction around the horizontal tilting shaft 24. By rotating the lever 27 in a screw fastening direction and fastening the nut 27*a* with respect to the fixation screw 26, the tilting base 22 can be fixed to the angular plate 25. When the tilting base 22 is fixed to the angular plate 25 by the fastening of the lever 27, a perpendicular cutting position (a position at which the cutting blade 12 is positioned to be perpendicular to the base 2) or an inclination position (a position at which the cutting blade 12 is inclined laterally with respect to the base 2) of the cutting device main body 10 is fixed. Further, angle scales 25*b* for indicating inclination angles of the cutting device main body 10 are indicated on the front surface and the outer circumferential surface of the angular plate 25 along the outer circumferential side of the groove hole 25*a*. For example, in the angle scales 25*b* of FIG. 3, angles of 0°, 15°, 22.5°, 30°, 45°, and 56° are indicated in this order. (In FIG. 3, the angles of 0° and 15° are hidden by the lever 27.)

A positive-lock-type inclination positioning dial 28 for accurately positioning the incline angles of 22.5°, 45°, and 56° of the cutting device main body 10 is provided on the front surface of the angular plate 25.

An exhaust hole 29 is provided on the lower side of the inclination positioning dial 28. The exhaust hole 29 penetrates the angular plate 25 in a plate thickness direction (front-rear direction). Further, the exhaust hole 29 is formed to be large enough to such a degree to maintain the necessary strength of the angular plate 25. As shown in FIG. 4, an air guide surface 29a is provided on the lower surface of the exhaust hole 29 such that it is slanted down toward the front side. As described below, the cooling air from the motor that flows into the exhaust hole 29 from the rear side of the angular plate 25 is effectively blown toward the marking line guide 2a of the base 2 by the air guide surface 29a.

The regulation wall portion 30 is provided on the right side of the angular plate such that it extends so as to be approximately flush with the angular plate 25. The regulation wall portion 30 has a small piece having the same plate thickness as the angular plate 25, and is provided to extend in the right direction from the angular plate 25. The regulation wall portion 30 is fixed to the base 2 and extends in an upward direction from the upper surface of the base 2. As shown in FIG. 3, a V shaped opening that is formed between a left inclination surface 30a of the regulation wall portion 30 and a right inclination surface 25c of the angular plate 25 corresponds to a ventilation portion 31 according to a first embodiment. A width of the ventilation portion 31 gradually narrows toward the lower side close to the base 2. As shown in FIG. 3, the lower end (a tip of the V shape portion) of the ventilation portion 31 is positioned near the cutting blade 12 with respect to a lateral width direction. Consequently, it is positioned at the marking line guide 2a of the base 2. In the present embodiment, the wind shielding portion S includes the angular plate 25 and the regulation wall portion 30. The angular plate 25 and the regulation wall portion 30 are disposed such that the former is positioned in the right direction and the latter is positioned in the left direction with respect to the cutting direction.

According to the above-described cutting device 1 of the present embodiment, the wind shielding portion S is provided to cross over the lateral width in the front side of the cutting blade 12. Accordingly, the cooling air from the electric motor 14, which is discharged to the front side through the exhaust ports 13d-13d, is blown to the rear surface of the wind shielding portion S which includes the angular plate 25 and the regulation wall portion 30. According to the wind shielding portion S, diffusion of the cooling air is regulated mainly in the forward direction, regardless of the perpendicular cutting or the inclination cutting.

As shown in FIG. 3, when the cutting device main body 10 is positioned at the perpendicular cutting position, the cooling air, which is discharged to the front side through the exhaust ports 13d-13d provided on the front portion of the cylindrical portion 13c, is blown mainly to the rear surface of the angular plate 25. A part of the blown cooling air is discharged to the front portion side of the base 2 via the exhaust hole 29 provided on the angular plate 25. The, the cooling air is blown in the vicinity of the marking line guide 2a. The diffusion of the cooling air to the right side is regulated by the wall portion 13b provided on the blade case 13. Accordingly, the cooling air effectively flows into the exhaust hole 29.

Further, the residual of the cooling air blown to the rear surface of the angular plate 25 flows to the right side (the lower side in FIG. 2) along the rear surface of the angular plate 25. The cooling air, which flows in the right direction with ventilation resistance being applied along the rear surface of the angular plate 25, is discharged in the forward direction through the ventilation portion 31 that is formed between the angular plate and the regulation wall portion 30. In the ventilation portion 31, the cooling air is not subjected to ventilating resistance. Accordingly, the cooling air does not flow to the rear surface of the regulation wall portion 30 and is effectively and smoothly discharged in the forward direction through the ventilation portion 31.

When the cutting device main body 10 is inclined to the right direction with respect to the cutting direction, the cooling air is largely blown to the regulation wall portion 30 of the wind shielding portion S. However, much of the cooling air flows to the ventilation portion 31 to which the ventilation resistance is not applied. Accordingly, similar to that which occurs during perpendicular cutting, the cooling air is effectively discharged to the marking line guide 2a through the ventilation portion 31.

In this way, in the cutting device according to the above-described embodiment, when the cutting device main body 10 is inclined to perform the inclination cutting, the cooling air discharged in the forward direction through the exhaust ports 13d-13d can be effectively blown to the marking line guide 2a. In this way, the accumulation of cutting powder is suppressed. Thus, improved workability of the cutting device 1 can be maintained.

Moreover, the ventilation portion 31 is formed in a V shape in which the width of the ventilation portion gradually narrows toward the lower side close to the base 2. With regard to a flow rate of the cooling air passing through the ventilation portion 31, the cooling air passes through the ventilation portion at a faster flow rate (purging ability of cutting powder) as it flows closer to the lower side toward the marking line guide 2a. Accordingly, it is ensured that the cutting powder can be purged in the vicinity of the marking line guide 2a.

The present invention is not limited to the above-described embodiments, and can be modified without departing from the scope of the present invention. In the above embodiment, the regulation wall portion 30 is integrally provided on the upper surface of the base 2. However, the regulation wall portion may be integrally provided on the angular plate 25. In this case, the angular plate 25 extends over the front side of the cutting blade 12 in the right direction to form the wind shielding portion. Further, the ventilation portion for causing the cooling air to pass through is provided in the wind shielding portion such that it is positioned at the front side of the cutting blade 12. In this configuration, the same effects can be obtained.

The exhaust hole 29 provided on the angular plate 25 and the wall portion 13b provided on the blade case 13 may be omitted.

Further, in the above embodiment, the ventilation portion 31 is formed in a V shape in which the width gradually narrows toward the lower side close to the base 2. However, the ventilation portion may be an opening or a groove hole in which the width is not changed in the up-down direction, or the ventilation portion may be one or a plurality of circular or rectangular ventilation holes.

Figure 5:
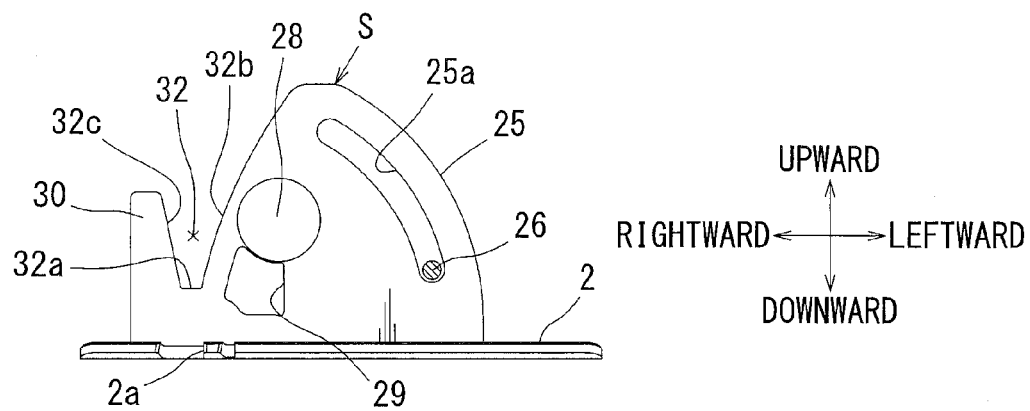
FIG. 5 is a front view of a wind shielding portion when a ventilation portion according to another embodiment is viewed from the front side.
Figure 6:
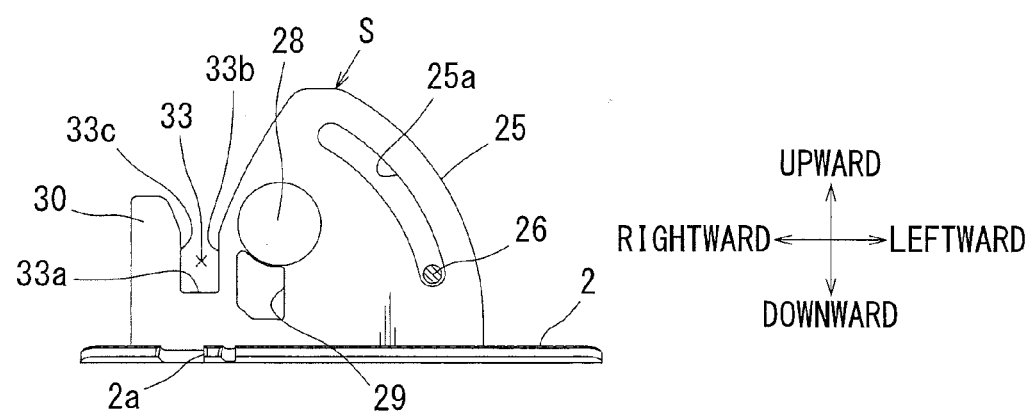
FIG. 6 is a front view of a wind shielding portion when a ventilation portion according to another embodiment is viewed from the front side.
Figure 7:
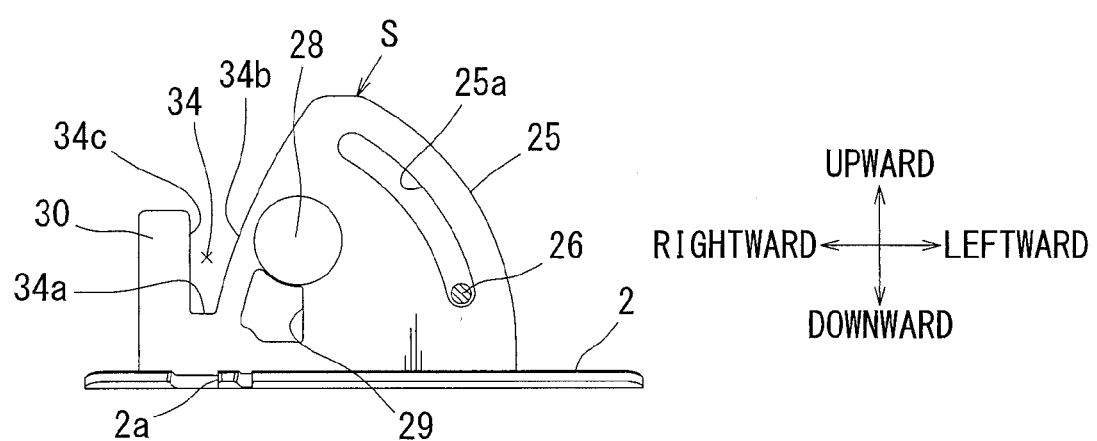
FIG. 7 is a front view of a wind shielding portion when a ventilation portion according to another embodiment is viewed from the front side.

FIGS. 5 to 7 show other embodiments with respect to the shape of the ventilation portion 31. In a ventilation portion 32 according to another embodiment shown in FIG. 5, the ventilation portion 32 is provided between the angular plate 25 and the regulation wall portion 30 in the same way as the ventilation portion 31. However, unlike the ventilation portion 31, a lower portion 32a of the ventilation portion 32 is formed to be flat (to be parallel to the base 2). Further, right and left sides 32c and 32b of the ventilation portion 32 are inclined (V shape) in the direction in which the sides 32b and 32c approach each other toward the lower side, as described above. Accordingly, the width of the ventilation portion 32 is gradually narrowed toward the lower side.

In a ventilation portion 33 according to another embodiment shown in FIG. 6, the ventilation portion 33 is provided between the angular plate 25 and the regulation wall portion 30. A lower portion 33a of the ventilation portion is formed to be flat in the same way as the above embodiment. Right and left sides 33c and 33b of the ventilation portion 33 according to this embodiment are formed to be parallel to the cutting blade 12 (not inclined) and to be parallel to each other. Accordingly, the width of the ventilation portion 33 according to this embodiment is not changed in the up-down direction.

In a ventilation portion 34 according to another embodiment shown in FIG. 7, the ventilation portion 34 is provided between the angular plate 25 and the regulation wall portion 30 and a lower portion 34a of the ventilation portion 34 is formed in a flat surface in parallel to the base 2. The left portion 34b (the right portion of the angular plate 25) of the ventilation portion 34 according to this embodiment is inclined in the same way as the above embodiments. On the other hand, the right portion 34c of the ventilation portion 34 (the left portion of the regulation wall portion) is formed to be parallel to the cutting blade 12.

According to the above-described ventilation portions 32 to 34, the cutting power accumulated near the marking line guide can be purged by the cooling air. Accordingly, high visibility of the marking line guide 2a is maintained.

We claim:

1. A cutting device comprising:
   a base that is brought into contact with an upper surface of a workpiece; and
   a cutting device main body that is supported on an upper surface side of the base and includes a circular cutting blade that is rotated by an electric motor, the circular cutting blade for cutting into the workpiece protruding toward a lower surface side of the base, wherein,
   a wind shielding portion is provided to cross between a marking line guide provided on a front portion of the base and the cutting blade; and
   a ventilation portion that guides air produced by a rotation of the electric motor in a forward direction, the ventilation portion being positioned at a front side of the cutting blade, the ventilation portion guiding the air produced by the rotation of the electric motor toward the marking line guide;
   wherein the wind shielding portion consists of a right wall portion and a left wall portion positioned on a right side and a left side, respectively, with respect to a plane defined by the cutting blade; and
   an opening serving as the ventilation portion is provided between the wall portions; the opening being formed to be open at an upper side which is opposite to a lower side adjacent to the base.

2. The cutting device according to claim 1, wherein
   one of the right and left wall portions is formed by an angular plate,
   the angular plate supports the cutting device main body such that the cutting device main body can be inclined in a lateral direction with respect to a cutting direction in which the workpiece is cut; and
   the opening for serving as the ventilation portion is formed between an inner surface of other of the right and left wall portions and an outer surface of the angular plate, the other of the right and left wall portions being different from the angular plate.

3. The cutting device according to claim 2, wherein the other of the right and left wall portions extends from the angular plate.

4. The cutting device according to claim 1, wherein the opening has a V shape such that a width of the opening gradually narrows toward a lower side adjacent to the base.

5. The cutting device according to claim 1, wherein:
   an exhaust hole is provided on a left side of the wind shielding portion with respect to the cutting blade in a cutting direction in which the workpiece is cut; and
   the wind shielding portion and the ventilation portion having the exhaust hole are configured to direct the air produced by the rotation of the electric motor toward the marking line guide through the ventilation portion and the exhaust hole.

6. The cutting device according to claim 1, wherein:
   the left wall portion is formed by an angular plate, the angular plate supporting the cutting device main body such that the cutting device main body can be inclined in a lateral direction with respect to a cutting direction in which the workpiece is cut;
   the right wall portion is attached to a lower portion of the angular plate, and
   the opening is formed by an inner surface of the right wall portion and an outer surface of an upper portion of the angular plate.

\* \* \* \* \*